Aug. 9, 1960   R. N. CROSS   2,948,236
JOURNAL BOX ARRANGEMENT
Filed Dec. 16, 1957
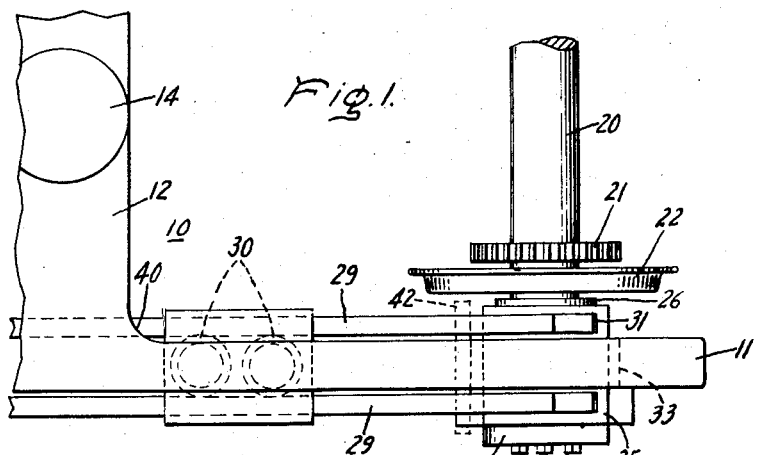
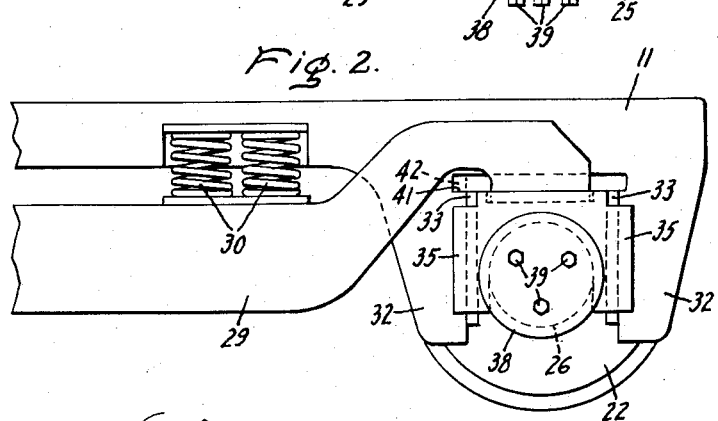
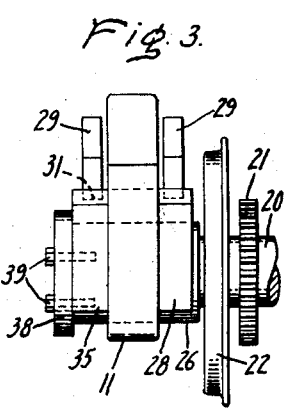
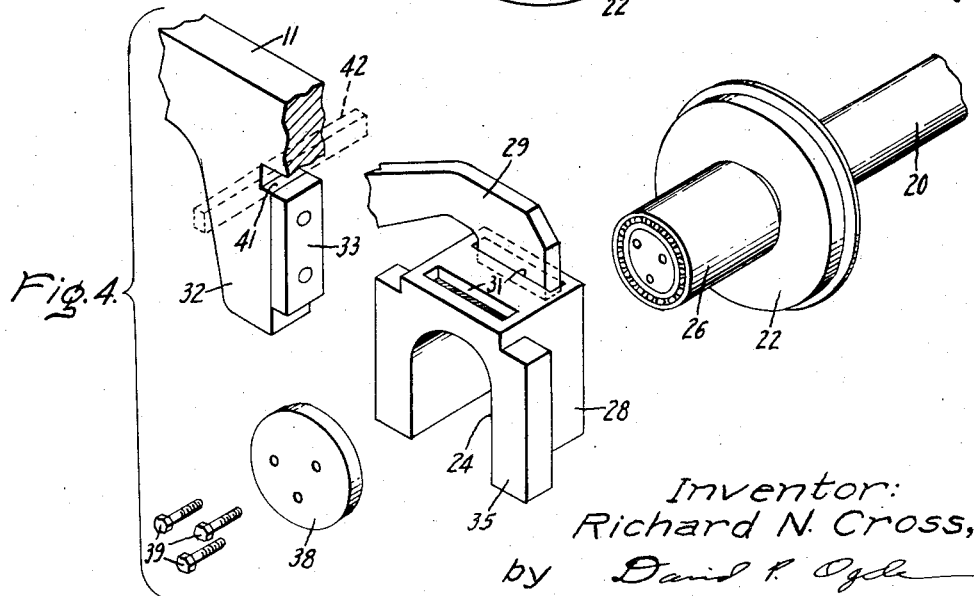
Inventor:
Richard N. Cross,
by David P. Ogle
His Attorney.

United States Patent Office 2,948,236
Patented Aug. 9, 1960

2,948,236

JOURNAL BOX ARRANGEMENT

Richard N. Cross, Erie, Pa., assignor to General Electric Company, a corporation of New York Filed Dec. 16, 1957, Ser. No. 702,918

4 Claims. (Cl. 105—220)

My invention relates to a journal box arrangement for a railway vehicle truck.

In the railroad industry, vehicles are carried on trucks which are in turn supported on journal boxes resting on rotatable axles, supported on wheels. Because of inherent roughness of the rail, it has been found most acceptable to provide a limited vertical motion between the journal box and the truck. Without this shock absorbing motion, the roughness of the rail would be transmitted directly to the vehicle. Such roughness results in shock loading at the wheels, which a more rigid construction would transmit directly to the truck, the vehicle or the cargo itself. Since a locomotive invariably carries at least one person and certain expensive equipment, this problem has been of importance in the locomotive business.

In the locomotive, driving thrust is transmitted from the axle to the truck by traction motors which drive the axles and by braking of the axles. This thrust obviously causes a longitudinal force to be exerted at the side of the journal box during acceleration and deceleration of the locomotive. Thus, vertical vibrations will cause the journal box to rub with sufficient friction to wear the journal box opening and the journal box sufficiently to require periodic replacement of associated wear plates.

In addition to the longitudinal driving or braking thrust, the axle transmits lateral thrust to the truck by means of the journal box each time the direction of motion of the locomotive is varied, e.g., on curves, etc. For many years in the past, it has been the accepted practice to mount the journal boxes to transmit lateral thrust by flanges engaging the inside surface of the truck frame which tends to spread the frames. This creates two distinct and severe problems.

First, when it is necessary to replace the journal box or wear plates, the locomotive maintenance crew was required to raise the truck sufficiently to allow the axle to drop completely out of the journal box cavity so that the worn parts can be replaced. Many railroads and industrial locomotive users find this task very difficult and dangerous with the limited hoisting equipment available.

Perhaps more important to the locomotive manufacturing industry is the fact that the outward thrust on the side members of the truck creates tension stresses in the cross members which prevent the side frame members of the truck from spreading apart. In the metal structural art, it is well known that variable tensile stresses are more likely than compressive stresses to cause fatigue damage. In the event there are any undesirable stress concentrations, particularly between the connections of the cross members and the side members, this outward thrust being counteracted by tension will tend to tear the truck apart. This problem is further aggravated by the leverage inherent in the truck structure of a locomotive. The location of the wheels, traction motor and gearing near the axle prevents the location of cross members close to the point at which lateral thrust forces are applied to the truck.

Therefore, an object of my invention is to provide a truck construction in which the cross members are loaded in compression by any lateral thrust and in which the journal boxes may be removed without untrucking the locomotive.

Briefly, in accordance with one modification of my invention, a truck for a railway vehicle such as the locomotive is provided with a plurality of journal box cavities, each adapted to accommodate one end of a railway axle journaled in bearings within a journal box having an outwardly extending flange which transmits any lateral thrust only to the outer surface of the truck frame. This assembly is insertable in the cavity over the end of the axle when the truck is assembled.

The subject matter which I regard as my invention is particularly pointed out and distinctly claimed in the concluding portion of this specification. My invention, however, as to its organization and method of operation together with further objects and advantages thereof, will best be understood by reference to the following description taken in connection with the accompanying drawing, in which:

Fig. 1 shows a top plan view of a segment of a truck embodying my invention;

Fig. 2 shows a side elevation view of the side frame member shown in Fig. 1;

Fig. 3 shows an end view of a segment of the truck shown in Fig. 1 including the journal box and its support; and Fig. 4 shows an exploded perspective view of the journal box of my invention.

Referring now to the drawing, in which like numerals refer to similar parts, in Fig. 1, I have shown a portion of a truck 10 having a side frame member 11 and a central transverse member 12 with a swivel center plate 14. If the truck is used on a locomotive, a traction motor (not shown) is hung from the truck. Usually, the traction motor is supported by the transverse member 12 and an axle 20 to drive a gear 21 and rotate a wheel 22 for propelling the locomotive over the rail. The axle 20, which supports the locomotive, extends outwardly into a journal box recess or cavity 24 and is supported therein by a journal box.

In one particular application, the journal box 25 is provided with a roller bearing assembly 26 (Fig. 4) which supports a housing member or bearing adapter 28 which in turn supports the side frame member 11 by a resilient means such as an equalizer 29 cooperating with the springs 30. The ends of the equalizer 29 are maintained in the journal box in the pockets or slots 31 as shown in Figs. 2 and 3. Thus, it is readily apparent that each end of the railroad vehicle is supported on the swivel center plate 14, the central transverse member 12, a pair of side frames 11, eight springs 30, four equalizers 29, four journal boxes 25, two axles 20, and four wheels 22. Obviously, the discussion below relates to all four journal boxes 25.

Because of inherent irregularities in the rail, it is essential to allow the journal box 25 to vibrate vertically in the journal box cavity 24. This vibration is facilitated by the springs 30 whereby vibrations caused by irregularities of the track will not cause excessive shock loading of the support members 14, 11, 25 and 20. During movement of the vehicle, it is obvious that the adapter 28 will rub on one or the other of the pedestals 32. Because of this rubbing action, the adapter 28 and the pedestals 32 will be eroded during continuing use of the vehicle. From time to time, this erosion will be sufficient to necessitate replacement of the adapter 28 and the wear plates 33.

It is well known in the railroad art that when a train negotiates curves, or travels over an irregular track, a sideways thrust is transmitted through the axle 20 to the side frame 11. In the past, this thrust has been absorbed by compressing a prior art thrust face (not shown) of the journal box against the inside of the side frame member 11 to tend to force the member 11 outward.

Tension loading of prior art trucks by sideward thrust forces creates stresses at the joint 40 between the transverse member 12 and the frame members 11. These stresses are concentrated by the construction at the joint 40 of the member 11 and repeated application of this thrust force has caused breakage at the joint 40 because of the tensile stress concentrations. This problem is particularly severe if the truck 10 is fabricated of individual parts which are secured to form an integral truck by means of welding with the welds occurring near or at the joint 40. In the past, considerable damage to trucks has occurred because of this tension. This problem has been aggravated on foreign railroads where the tracks are particularly rough and the curves are particularly sharp. Obviously, the use of my invention to prevent such breakage of a truck will eliminate considerable expense both in the train stoppage and in replacement of heavy parts.

According to my invention, a sideways thrust (to the right, as shown in Fig. 3) will cause the flanges 35 of the adapter 28 to engage the outer side of the pedestals 32 to place the axle 20 in tension and tend to force the side frame member 11 inward. With the usual configuration of the axle 20, the amount of tension caused therein by such stresses will not damage it. The inward force by the journal boxes 25 on the side frame member 11 is assured by an end plate 38 which is secured to each end of the axle 20 by a plurality of bolts 39. Since this sideways thrust forces the side frame member 11 toward the center of the truck, the connections between the side frame member 11 and the cross member 12 will be stressed in compression. A similar compression will result in the cross member 12.

Moreover, according to my invention, I am able to replace both the adapter 28 and the bearing assembly 26 without jacking the truck high enough to free completely the adapter from the pedestals 32.

With the construction shown in Fig. 4, each inner pedestal 32 is provided with platform 41 suitable for supporting a steel pin 42 (in dotted lines) which may be used during repair of these wear plates 33 and the journal box 25. When used, the pin 42 extends outward sufficiently to engage the two equalizers 29.

Thus, to replace the wear plates 33, jacks may be placed to engage a pedestal 32 at the end of the truck to lift it up sufficiently to free the adapter 28 while the steel pin 42 lifts one end of the equalizers 29. Usually 2 or 3 inches of jacking will accomplish this. After this jacking has been accomplished, the bolts 39 are removed and the plate 38 is freed. After removal of the plate 38, there is no obstruction to prevent simply lifting the adapter 28 and pulling it straight out from the roller bearing assembly 26.

Usually at this time, the wear plates 33 will be shimmed or replaced. Also, if the bearing is faulty, it can be replaced. A new adapter is positioned over the axle and moved into the cavity 24 after the plates 33 have been replaced. Then the bolts 39 are tightened to hold the plate 38 in place. Almost every locomotive user has sufficient facilities to accomplish this simple jacking operation.

While I have shown and described a particular modification of my invention, other modifications will occur to those skilled in the art. For instance, this invention is applicable to a 1- or 3-axle truck or a solid frame locomotive with two or more axles. Also, a more complicated or different means for transmitting the tension of the axle 20 to the outer side of the side frames 11 might be used and other journal box assemblies might be modified to use my invention. I intend by the appended claims to cover all such modifications as fall within the true spirit and scope of my invention.

What I claim as new and desire to secure by Letters Patent of the United States is:

1. A railroad vehicle truck comprising a pair of side frame members, a rigid cross member connecting said side frame members, a first pair of aligned journal box cavities, one of said first pair of cavities being defined in one of said side frame members and the other of said first pair of cavities being defined in the other of said side frame members, a second pair of aligned journal box cavities, one of said second pair of cavities being defined in one of said side frame members and the other of said second pair of cavities being defined in the other of said side frame members, an axle mounted in each of said pairs of journal box cavities, each of said cavities having a housing member positioned therein, a bearing within the housing member for rotatably journaling one end of the corresponding axle, a thrust bearing member on the ends of each axle extending radially therefrom to provide a thrust bearing surface between the end of each axle and the corresponding housing member, each housing member having flanges only on the outside of the corresponding side frame member to impart lateral thrust between the housing and the outside of the corresponding side frame member, whereby only compressive stresses are applied to said cross member.

2. A railroad vehicle truck comprising a pair of side frame members, a rigid cross member connecting said side frame members, a first pair of aligned journal box cavities, one of said first pair of cavities being defined in one of said side frame members and the other of said first pair of cavities being defined in the other of said side frame members, a second pair of aligned journal box cavities, one of said second pair of cavities being defined in one of said side frame members and the other of said second pair of cavities being defined in the other of said side frame members, an axle mounted in each of said pairs of journal box cavities, each of said cavities having a housing member positioned therein, an antifriction bearing within the housing member for rotatably journaling one end of the corresponding axle, a thrust bearing member on the ends of each axle extending radially therefrom to provide a thrust bearing surface between the end of each axle and the corresponding housing member, each housing member having flanges only on the outside of the corresponding side frame member to impart lateral thrust between the housing member and the outside of the corresponding side frame member, whereby only compressive stresses are applied to said cross member.

3. A railroad vehicle truck comprising a pair of side frame members, a rigid cross member connecting said side frame members, a first pair of aligned journal box cavities, one of said first pair of cavities being defined in one of said side frame members and the other of said first pair of cavities being defined in the other of said side frame members, a second pair of aligned journal box cavities, one of said second pair of cavities being defined in one of said side frame members and the other of said second pair of cavities being defined in the other of said side frame members, an axle mounted in each of said pairs of journal box cavities, each of said cavities having a housing member positioned therein, a bearing within the housing member for rotatably journaling one end of the corresponding axle, a thrust bearing member removably secured to the end of said corresponding axle and extending outwardly therefrom to provide a thrust bearing surface between the axle and the housing member, each housing member having flanges only on the outside of the corresponding side frame member to impart lateral thrust between the housing member and the outside of the corresponding side frame member, whereby only compressive stresses are applied to said cross member.

4. A railroad vehicle truck comprising a pair of side frame members, a rigid cross member connecting said side frame members, a first pair of aligned journal box cavities, one of said first pair of cavities being defined in one of said side frame members and the other of said first pair of cavities being defined in the other of said side frame members, a second pair of aligned journal box cavities, one of said second pair of cavities being defined in one of said side frame members and the other of said second pair of cavities being defined in the other of said side frame members, an axle mounted in each of said pairs of journal box cavities, each of said cavities having a housing member positioned therein, an anti-friction bearing within the housing member for rotatably journaling one end of the corresponding axle, a thrust bearing member removably secured to the end of said corresponding axle and extending outwardly therefrom to provide a thrust bearing surface between the axle and the housing member, each housing member having flanges only on the outside of the corresponding side frame member to impart lateral thrust between the housing member and the outside of the corresponding side frame member, whereby only compressive stresses are applied to said cross member.

References Cited in the file of this patent

UNITED STATES PATENTS

| | | |
|---|---|---|
| 1,712,748 | Clasen | May 14, 1929 |
| 2,059,963 | Barrows | Nov. 3, 1936 |